United States Patent [19]

Gratrix et al.

[11] Patent Number: 5,148,319
[45] Date of Patent: Sep. 15, 1992

[54] SYSTEM FOR FABRICATING MICRO OPTICAL ELEMENTS

[75] Inventors: Edward Gratrix, Trumbull; Charles Zarowin, Rowayton, both of Conn.

[73] Assignee: Hughes Aircraft Company, Los Angeles, Calif.

[21] Appl. No.: 660,385

[22] Filed: Feb. 25, 1991

[51] Int. Cl.$^5$ ............................................. G03C 5/00
[52] U.S. Cl. .................................... 359/642; 359/900
[58] Field of Search .................... 250/492.1; 430/321, 430/397; 359/900, 642

[56] References Cited

U.S. PATENT DOCUMENTS

| | | | |
|---|---|---|---|
| 3,547,074 | 12/1970 | Hirschfeld | 250/492.1 X |
| 3,775,110 | 11/1973 | Bestenreiner et al. | 359/900 X |
| 4,737,447 | 4/1988 | Suzuki et al. | 359/900 X |
| 4,778,747 | 10/1988 | Ohta et al. | 430/321 |
| 4,861,140 | 8/1989 | Lucitte et al. | 359/900 X |
| 4,911,733 | 3/1990 | Matsumoto et al. | 250/492.1 |

OTHER PUBLICATIONS

M. T. Gale & K. Knop, The Fabrication of Fine Lens Arrays by Laser Beam Writing, Proc. SPIE, vol. 398, pp. 347-353, 1983.

*Primary Examiner*—Constantine Hannaher
*Assistant Examiner*—Edward J. Glick
*Attorney, Agent, or Firm*—W. K. Denson-Low; W. J. Streeter; R. A. Hays

[57] ABSTRACT

A system for fabricating optical elements includes a source of optical radiation that provides an optical beam, the system includes an intensity controller in the path of the beam. The intensity controlled beam is directed toward a substrate disposed on a stage. The stage is adopted to be controllably translated in accordance with an optical intensity map.

13 Claims, 1 Drawing Sheet

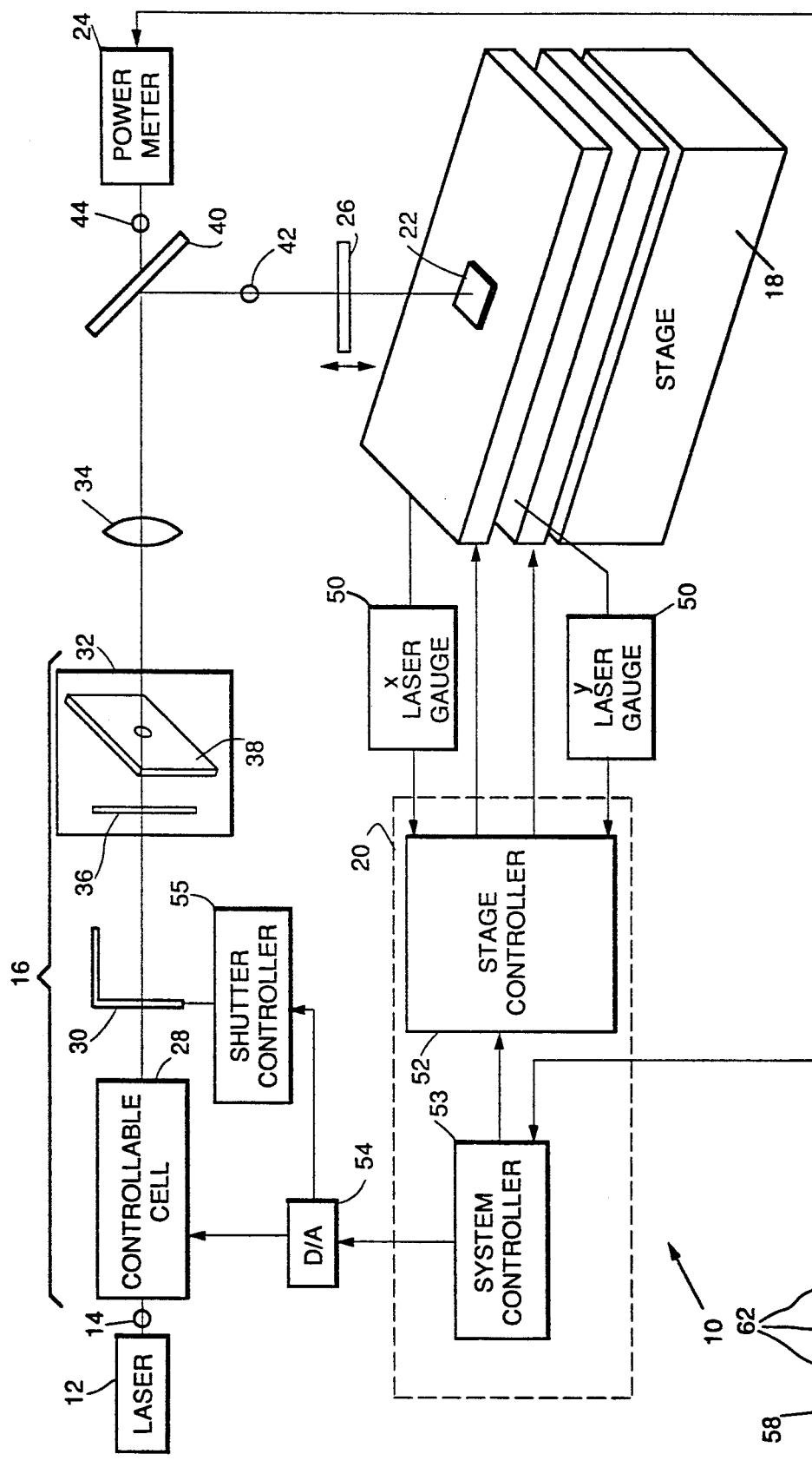

SYSTEM FOR FABRICATING MICRO OPTICAL ELEMENTS

BACKGROUND OF THE INVENTION

The present invention generally relates to a system for fabricating micro optical elements and, in particular, relates to one such system having means for providing relative motion between a beam of optical radiation and a support for a substrate in accordance with a precalculated pattern that is then implemented as an optical radiation intensity map.

As used herein the phrase "micro optical element" is taken to mean those optical elements that are not reasonably susceptible to fabrication by standard optical grinding and polishing techniques.

In recent history there has been many improvements in optical materials as well as opto-electronic materials and hybrid micro-electronic/optic circuits. Concurrent with such improvements, there has been an increased demand for high resolution micro optical elements to support applications of the new materials and circuits. For example, the wide-spread use of optical fibers has increased the demand for such high-quality micro-optical elements. Further, considerable effort is being expended to improve the efficiency of optical detector arrays. Other general fields that have a need for high quality micro-optical elements and/or arrays include digital optical processors, optical communication systems and laser diode systems, to name but a few.

To date a number of systems and techniques have been advanced for the fabrication of micro optical elements. These systems and techniques include lithographically generated binary optics, mass transport systems, controlled melting techniques, molded elements, electron/ion beam fabrication, photolytic shaping, material impression and photoelectrochemical etching systems.

Although each of the above systems and techniques has well known benefits each has been determined to suffer from one or more physical limitations such as inability to accurately reproduce large arrays of elements inadequate optical resolution of the elements produced; inability to achieve high numerical apertures; inability to operate over a wide spectral range; inability to control aspheric characteristics and/or an inability to reliably produce devices having a plurality of different micro optical elements integrated thereon.

Hence, in light of the above, there is a significant need and desire for a system for fabricating micro optical elements that overcomes the above recited drawbacks of the current technology.

SUMMARY OF THE INVENTION

Accordingly, this object is accomplished, at least in part, by a system for fabricating micro optical elements having means for providing relative motion between a beam of optical radiation and a support for a substrate in accordance with a precalculated pattern that is defined by an optical radiation intensity map.

Other objects and advantages will become apparent to those skilled in the art from the following detailed description of the invention read in conjunction with the attached drawing.

BRIEF DESCRIPTION OF THE DRAWING

FIG. 1 is a block diagram of a system, embodying the principles of the present invention, for fabricating micro optical elements; and FIG. 2 is a cross-section of an optical element useful in the system shown in FIG. 1.

DETAILED DESCRIPTION OF THE INVENTION

A system, generally indicated at 10 in FIG. 1, for fabricating micro optical elements includes a source of optical radiation 12 for producing a beam 14 of optical radiation, means 16 for controlling the intensity of the beam 14 of optical radiation, a substrate platform 18 and means 20 for providing controlled relative motion between the beam 14 and the substrate platform 18 in accordance with a preselected pattern defined by an optical radiation intensity map. As more fully discussed below, the optical radiation intensity map for a given optical element is a representation of the optical radiation brightness required at each beam position across a substrate 22 to produce that optical element. It will be understood that the phrase "given optical element" generally incorporates the complete prescription for that element including, but not limited to, such characteristics as focal length, stigmatism, coma and selected aberrations, if any. In addition, as well known in the art, the "exposure" by the beam of optical radiation includes the factors of both the intensity and the dwell time thereof. The calculation of the intensity pattern needed to generate the optical elements is obtained by well known deconvolution techniques.

In addition, the system 10 can also include a means 24 for monitoring the power of the beam 14 as well as means 26 for controlling the focus of the beam 14.

In one preferred embodiment, the source of optical radiation 12 is an Argon ion laser that provides a beam 14 of optical radiation on the order of 488 nanometer.

Preferably, the means 16 for controlling the intensity of the beam 14 of optical radiation, in this exemplary embodiment, includes an externally controllable cell 28, a shutter 30, a spatial filter 32 and a beam collimator 34. For the specific embodiment described hereinafter the externally controllable cell 28 can be a commercially available intensity controlling Pockels such as, for example, the Model No. LASS II cell manufactured and marketed by Conoptics of Danbury, Conn. Such a cell 28 not only provides a precisely controlled output intensity but additionally filters noise from the beam 14 of optical radiation passing therethrough.

As shown in FIG. 1, the means 16 for controlling the intensity of the beam 14 of optical radiation can also include an externally controllable shutter 30. The inclusion of the shutter 30 is preferred, although not necessarily required. For example, even in an embodiment where the cell 28 is capable of reducing the optical radiation intensity output thereof to zero, the shutter 30 may nonetheless be used to ensure zero beam intensity and to reduce spurious or stray optical radiation that may be present either from the cell 28 or the immediate surrounding environment.

The spatial filter 32 is disposed in the path of the beam 14 of optical radiation and ensures that the exiting optical radiation is composed of a known and controllable shape to enable definition of a desired static footprint. As more fully discussed below, the static footprint is the effective shape of the beam 14 of optical radiation In essence, the static footprint is, on a macroscopic scale, somewhat comparable to the cross-sectional impression of a router bit into a workpiece. The static footprint effectively defines the minimum three dimensional feature size available. Hence, the spatial filter, focusing lens combination 32 ensures that the beam 14 of optical radiation contains only optical radiation with spatial frequencies less than the desired static footprint.

In the preferred embodiment the spatial filter 32 includes a microscopic objective lens 36 and a pinhole aperture 38 serially aligned along the beam path.

The spatial filter 32 further provides the function of establishing the decade of over which the intensity controllable cell 28 is operated. In addition, the spatial filter 32 operates to further reduce the beam noise, in particular, the longitudinal beam aberrations. This ensures that the beam provided to the remainder of the system 10 has a consistent and determinable profile.

In the embodiment shown in FIG. 1, a beam splitter 40 is disposed in the path of the beam 14 so that the beam impinges thereon as it exits the collimator 34. As shown in FIG. 1, beam 14 is split into two portions, an operating portion 42 and a monitoring portion 44. The operating portion 42 is directed by the beam splitter 40 to a movable focusing lens 26 whereas the monitoring portion 44 is directed to a power meter 48 that measures the beam power. Hence, by knowing the percentage of the split between the operating portion 42 and the monitoring portion 44 and measuring the power of the monitoring portion 44 the power in the operating portion 42 can be determined.

The focusing lens 26 is disposed in the path of the operating portion 42 of the beam and is arranged so that it can be moved to ensure the desired focus, and thus the size and brightness of the beam 42 impinging on the substrate 22. The focusing lens 26 can be any lens that has the capability to focus the operating portion 42 within the system dimensions.

The substrate platform 18 upon which the substrate 22 is disposed is preferably adapted to provide two dimensional movement in a plane normal to the impinging light beam 42. Such platforms are well known in the art, and in the preferred embodiment, the actual translation of the platform is finely controlled by use of a pair of laser gauges 50 disposed orthoginal to each other. Although most commercial laser gauges 50 will function accurately enough, in the preferred embodiment, the laser gauges 50 are of the type manufactured and marketed by Teletrac, Inc.

In one embodiment, the laser gauges 50 are connected to a stage controller 52 that is a part of the means 20 for providing controlled relative motion between the operating beam and the substrate platform 18. The means 20 is further connected to a digital-to-analog converter 54 for regulating the shutter 30 via a shutter controller 55 and the intensity controller 16.

In one alternative wherein a substantial number of identically shaped surfaces are to be fabricated, multiple beams can readily be used to generate these in parallel. The multiple beams are preferably controlled by use of a single controllable cell 28. In this embodiment the focusing lens 26 is replaced by a means 56 for generating an array of operating beams registered to the array dimensions. One particular implementation of such a means 56 is shown in FIG. 2. As shown therein the operating portion 42 provides a uniform plane wave that impinges upon the means 56 for providing a plurality of operating portions. As shown in FIG. 2, the means 26 includes a transparent support member 58 proximate the uniform plane wave direction and an opaque mask 60 disposed on a surface of the support. The opaque mask is adapted to have a plurality of pinholes 62 therein, which allow an equal number of operating portions to impinge upon the substrate 22.

The means 20 for providing controlled relative motion between the beam 14 and the substrate platform 18 includes a system controller 53 and a stage controller 52. Preferably, the system controller 53 is a computer controller having the optical radiation intensity map stored in memory therein. The system controller 53 interfaces, in this embodiment, with the controllable cell 28, the shutter 30 and the power meter 24 to control the intensity of the operating beam 42. Additionally, the system controller 53 interfaces with the stage controller 52 to control the motion of the substrate platform 18.

It is understood that although a particular embodiment of a means 56 as shown in FIG. 2 any other means that provides a plurality of identical beams having identical footprints can also be used effectively to generate micro-optical element arrays.

In operation, the system 10 incorporates, within the means 20, the optical intensity map of a desired micro optical element which optical intensity map is determined by first selecting the characteristics of the element to be fabricated and then deconvoluting the characteristics of the element with the footprint of the beam after photodevelopment. In the preferred embodiment, the base material for the micro optical element to be created is selected in accordance with conventional micro optical element fabrication techniques.

In the embodiment where the micro optic element is to be created using photolithographic techniques the base material is selected in accordance with conventional micro optical element fabrication and the photo resist that is to be used is also selected. In one particular example the base material can be glass and the photo resist can be Shipley 1400-17.

In the event that the experimental database is insufficient for the particular micro optical element to be fabricated a test run is made to empirically determine the required beam footprint. The size of the footprint is selected to be smaller than the resolution element or maximum spatial frequency required to attain the shape of the micro optical element to be fabricated. The footprint is then used on a test substrate having a layer of the preselected photo resist thereon. The results of this empirical measurement provides a power/dwell time database of the system. This information is then incorporated into the database for the optical element to be fabricated. Thus the system controller 20 is programmed to effectively trace the desired optical element profile with the operating portion of the beam 42 such that a complimentary figuring of the optical element is accomplished in the photo resist. Hence when the photo resist is removed the remaining material forms the optical element figured as desired. The opticalelement is accurate to within the spatial frequency content of the beam yielding the desired characteristics.

This approach significantly differs from conventional laser assisted chemical etching techniques in that here the laser footprint is not assumed to be a delta function, but in fact is treated as a three dimensional removal tool having a finite size and shape, which when convolved with the dwell time produces the required removal of material.

Although the present invention has been discussed and described herein with regard to particular embodiments it will be understood that other arrangements, and configurations may be implemented by those skilled in the art without departing from the spirit and scope of the present invention. Hence, the present invention is deemed limited only by the claims as set forth hereinafter and the reasonable interpretation thereof.

What is claimed is:

1. A system for fabricating optical elements, said system comprising:
    a source of optical radiation, said source providing an optical beam, said beam defining an optical beam path;
    means, disposed in said optical path, for controlling the intensity of said optical radiation, said intensity controlling means including an externally controllable Pockels cell, a shutter disposed in said optical beam path, a spatial filter disposed in said optical beam path distal said shutter and a beam collimator disposed in said beam path subsequent said spatial filter;
    means for supporting a substrate of photosensitive material;
    means for focusing said optical radiation; and
    means for providing relative motion between said substrate and said focussed optical radiation means in accordance with a preselected pattern, said preselected pattern being defined by an optical radiation intensity map of at least one optical element.

2. System as claimed in claim 1 wherein said spatial filter includes:
    a microscopic objective lens; and
    a pinhole aperture, said microscopic objective lens and said pinhole aperture being serially aligned along the path of the optical path.

3. System as claimed in claim 1 further comprising: means for controlling said shutter.

4. System as claimed in claim 3 wherein said shutter control means includes a digital-to-analog convertor.

5. System as claimed in claim 1 wherein said substrate support means includes a two dimensionally translatable platform.

6. System as claimed in claim 5 wherein said means for providing relative motion includes:
    first and second laser gauges disposed such that a two dimensional grid is controlled.

7. System as claimed in claim 6 wherein said first and second laser gauges are disposed orthogonally.

8. System as claimed in claim 7 wherein said means for controlling relative motion includes:
    a system controller, said system controller having said optical radiation intensity map in memory therein; and a stage controller, for controlling the position of said substrate support means in accordance with position signals from said laser gauges and command signals from said system controller.

9. System as claimed in claim 1 further comprising:
    means for monitoring the power of said optical beam.

10. System as claimed in claim 9 wherein said power monitoring means includes:
    a beam splitter disposed in said path of said optical beam such that said optical beam is split into a first portion and a second portion, and first and second portions traversing different paths; and
    a power meter, said power meter being disposed in the path of one of the portions of the split optical beam.

11. System as claimed in claim 1 further comprising:
    means for generating a plurality of beams, said beams having substantially identical footprints.

12. System as claimed in claim 11 wherein said means for generating a plurality of beams includes:
    a transparent support member disposed in said optical beam path; and
    an opaque mask disposed on a surface of said support member proximate said substrate support means, said opaque mask having a plurality of openings therein.

13. System as claimed in claim 12 where said openings in said opaque mask are disposed in the pattern of an array.

* * * * *